United States Patent [19]

Kojima

[11] Patent Number: 5,499,799
[45] Date of Patent: Mar. 19, 1996

[54] VIBRATION ISOLATING APPARATUS

[75] Inventor: Hiroshi Kojima, Yokohama, Japan

[73] Assignee: Bridgestone Corporation, Japan

[21] Appl. No.: 458,769

[22] Filed: Jun. 2, 1995

[30] Foreign Application Priority Data

Jun. 20, 1994 [JP] Japan .................................. 6-136967

[51] Int. Cl.⁶ ...................................................... F16F 9/00
[52] U.S. Cl. ...................................................... 267/140.13
[58] Field of Search ........................ 267/140.11, 140.13, 267/35, 219; 248/562, 636, 638

[56] References Cited

U.S. PATENT DOCUMENTS 5,145,156  9/1992  Muramatsu et al. ................ 267/219 X

FOREIGN PATENT DOCUMENTS

| 4-321833 | 11/1992 | Japan . | |
|---|---|---|---|
| 4312231 | 11/1992 | Japan ................................ | 267/140.13 |
| 5272575 | 10/1993 | Japan ................................ | 267/140.13 |
| 2237355 | 5/1991 | United Kingdom ............. | 267/140.13 |

*Primary Examiner*—Josie Ballato

*Attorney, Agent, or Firm*—Oliff & Berridge

[57] ABSTRACT

A vibration isolating apparatus includes: a first mounting member; a second mounting member; an elastic body interposed between the first mounting member and the second mounting member; a main liquid chamber filled with a liquid; a first sub-liquid chamber separated from the main liquid chamber by a partition wall member interposed between the main liquid chamber and the first sub-liquid chamber, at least a portion of an inner wall of the first sub-liquid chamber being provided to be deformable; a first orifice formed in the partition wall member and provided for communication between the main liquid chamber and the first sub-liquid chamber; a second sub-liquid chamber formed in the partition wall member so as to face the main liquid chamber; an elastic membranous body formed into the shape of a membrane and provided to separate the main liquid chamber and the second sub-liquid chamber from each other; and a second orifice provided for communication between the first sub-liquid chamber and the second sub-liquid chamber and provided such that a transit resistance of a liquid in the second orifice is smaller than that in the first orifice. This makes it possible to reliably reduce vibrations in a range from low frequencies to high frequencies.

24 Claims, 6 Drawing Sheets

VIBRATION ISOLATING APPARATUS

BACKGROUND OF THE INVENTION

1. Field of the Invention

The present invention relates to a vibration isolating apparatus which prevents transmission of vibration from a vibration-generating member, and particularly to a vibration isolating apparatus which is applicable to a kind of mount supporting an engine mounted on a vehicle.

2. Description of the Related Art

Heretofore, a vibration isolating apparatus used as an engine mount is disposed between an engine which is a vibration-generating portion of a vehicle and a vehicle body which is a vibration-receiving portion. The vibration isolating apparatus absorbs vibration generated by the engine and prevents the vibration from being transmitted to the vehicle body.

However, when a vibration isolating apparatus having a simple structure damps vibration in a low frequency range where shake vibration is generated (which is hereinafter referred to as a shake vibration range), a dynamic spring constant of an idle vibration range which is a frequency range higher than shake vibration range inversely increases, vibration in an idle vibration range cannot be sufficiently reduced. On the contrary, when the dynamic spring constant in the idle vibration range is decreased, vibration in the shake vibration range cannot be sufficiently damped.

Accordingly, there has been discussed a structure having a plurality of orifices in order to solve the above-described problems.

For example, there has been proposed a vibration isolating apparatus 200 as shown in FIG. 6.

The vibration isolating apparatus 200 is constructed as follows. An elastic body 116 is disposed between a bottom plate 110 having a bolt 112 of the vibration isolating apparatus 200, and a top plate 118 with a bolt 120 and a connecting plate 119. The top plate 118 and the connecting plate 119 are connected with each other by welding, so that an end portion of a flange portion 119A of the connecting plate 119 abuts against the elastic body 116.

A main liquid chamber 126 and a first sub-liquid chamber 128 are disposed under the elastic body 116 with a partition wall member 124 interposed between the main liquid chamber 126 and the first sub-liquid chamber 128. The main liquid chamber 126 and the first sub-liquid chamber 128 are connected with each other by a first orifice 130 formed in the partition wall member 124. Further, a second sub-liquid chamber 142 connected with the main liquid chamber 126 by a second orifice 144 is formed within the partition wall member 124.

In other words, the vibration isolating apparatus 200 is constructed in that a plurality of liquid chambers 126, 128 and 130 are provided in addition to the elastic body 116 and the liquid chambers 126, 128 and 130 are connected by a plurality of orifices 130, 144 each serving as a restricting passage. When the engine mounted on the vibration isolating apparatus 200 operates and vibration is generated, vibration is absorbed by a damping function of the elastic body 116, viscous resistance of a liquid within the orifices 130, 144 provided for communication between the liquid chambers 126, 128 and 130, or the like. As a result, transmission of vibration is prevented.

However, in the vibration isolating apparatus 200, a diaphragm 132 allowing the capacity of the first sub-liquid chamber 128 to vary is disposed at a lower side of the first sub-liquid chamber 128 and a diaphragm 146 is needed at a lower side of the second sub-liquid chamber 142 as well. For this reason, in the vibration isolating apparatus 200, it becomes necessary to provide the second sub-liquid chamber 142 and the diaphragm 146 within the partition wall member 124, and the structure of the partition wall member 24 becomes complicated. As a result, there exists a drawback in that the cost of manufacturing the vibration isolating apparatus 200 will increase.

On the other hand, in the vibration isolating apparatus 200 as described above, the length of the second orifice 144 in the longitudinal direction thereof which is used to reduce vibration in an idle vibration range cannot be sufficiently obtained and vibration in an idle vibration range cannot be sufficiently reduced. As a result, directly-opposed characteristics of a shake vibration range and an idle vibration range cannot be sufficiently satisfied. Further, when vibration of a higher frequency range is generated by the engine, the vibration cannot be reduced sufficiently.

In the conventional vibration isolating apparatus described hereinbefore, there exist drawbacks in that vibrations of a wide range of frequencies cannot be reduced sufficiently and a large vibration is transmitted to the vibration-receiving portion depending on the frequency of vibrations.

SUMMARY OF THE INVENTION

In view of the above-described circumstances, it is an object of the present invention to provide a vibration isolating apparatus which is capable of reliably reducing vibrations even when vibrations of a wide range of frequencies are generated, while reducing the cost of manufacturing the apparatus.

In accordance with one aspect of the present invention, there is provided a vibration isolating apparatus which comprising: a first mounting member connected to one of a vibration-generating portion and a vibration-receiving portion; a second mounting member connected to another of the vibration-generating portion and the vibration-receiving portion; an elastic body mounted in such a manner as to be interposed between the first mounting member and the second mounting member; a main liquid chamber of which at least a portion of an inner wall is formed of the elastic body and which is filled with a liquid; a first sub-liquid chamber separated from the main liquid chamber by a partition wall member interposed between the main liquid chamber and the first sub-liquid chamber, at least a portion of an inner wall of the first sub-liquid chamber being provided to be deformable; a first orifice formed in the partition wall member and provided for communication between the main liquid chamber and the first sub-liquid chamber; a second sub-liquid chamber formed in the partition wall member so as to face the main liquid chamber; an elastic membranous body formed into the shape of a membrane and provided to separate the main liquid chamber and the second sub-liquid chamber from each other; and a second orifice provided for communication between the first sub-liquid chamber and the second sub-liquid chamber and provided such that a transit resistance of a liquid in the second orifice is smaller than that in the first orifice.

The above-described vibration isolating apparatus has the following operation.

When vibration is generated by the vibration-generating portion, vibration is transmitted to the elastic body via the first mounting member or the second mounting member. Since the vibration is absorbed by deformation of the elastic body, vibration is difficult to be transmitted to the vibration-receiving portion connected to the second mounting member or the first mounting member.

Further, when vibration generated by the vibration-generating portion is a low frequency vibration, the elastic body deforms and the main liquid chamber expands and contracts. At the same time, the liquid flows reciprocatingly between the main liquid chamber and the first sub-liquid chamber connected with the main liquid chamber via the first orifice. Thus, a vibration isolating effect can be improved by a damping function based on viscous resistance when the liquid passes through the first orifice and on liquid resonance.

Moreover, when vibration generated by the vibration-generating portion is a medium frequency vibration, the first orifice becomes clogged. With the elastic membranous body being deformed, the medium frequency vibration is transmitted to the second sub-liquid chamber opposing the main liquid chamber via the elastic membranous body.

For this reason, the liquid flows reciprocatingly between the first sub-liquid chamber and the second sub-liquid chamber via the second orifice whose transit resistance is smaller than that of the first orifice. Thus, a vibration isolating effect with respect to the medium frequency vibration can be improved.

On the other hand, when vibration generated by the vibration-generating portion is a high frequency vibration, the first orifice and the second orifice respectively become clogged. The elastic membranous body interposed between the main liquid chamber and the second sub-liquid chamber deforms in a corrugated state or the like. Since the high frequency vibration is absorbed by the elastic membranous body being deformed, a vibration isolating effect can be improved.

In addition, since the elastic membranous body is also used as a partition wall of the second sub-liquid chamber, the structure of the vibration isolating apparatus becomes simple, thereby resulting in decrease in cost of manufacturing the vibration isolating apparatus.

It is preferable that, in the present invention, the length of the second orifice in the longitudinal direction thereof is longer than the thickness of the partition wall member. Due to the above-described vibration isolating apparatus, in order to improve a vibration isolating effect with respect to the medium frequency vibration, it is possible to freely select an arbitrary frequency from the medium frequency range and to reduce vibrations.

In accordance with another aspect of the present invention, there is provided a vibration isolating apparatus which comprises: a first mounting member connected to one of a vibration-generating portion and a vibration-receiving portion; a second mounting member connected to another of the vibration-generating portion and the vibration-receiving portion; an elastic body mounted in such a manner as to be interposed between the first mounting member and the second mounting member; a main liquid chamber of which at least a portion of an inner wall is formed of the elastic body and which is filled with a liquid; a first sub-liquid chamber separated from the main liquid chamber by a partition wall member interposed between the main liquid chamber and the first sub-liquid chamber, at least a portion of an inner wall of the first sub-liquid chamber being provided to be deformable; a first orifice formed in the partition wall member and provided for communication between the main liquid chamber and the first sub-liquid chamber; a second sub-liquid chamber formed in the partition wall member so as to face the main liquid chamber; an elastic membranous body formed into the shape of a membrane and provided to separate the main liquid chamber and the second sub-liquid chamber from each other; and a second orifice provided for communication between the first sub-liquid chamber and the second sub-liquid chamber and provided such that a length of the second orifice in a longitudinal direction thereof is shorter than that of the first orifice or provided such that a cross-sectional area of the second orifice is greater than that of the first orifice.

The above-described vibration isolating apparatus has the following operation.

This vibration isolating apparatus has substantially the same operation as that of the previously-described aspect of the vibration isolating apparatus. However, in this aspect of the vibration isolating apparatus, the second orifice is formed in such a manner that the length thereof in the longitudinal direction is shorter than that of the first orifice or the cross-sectional area thereof is larger than that of the first orifice.

For this reason, when vibration generated by the vibration-generating portion is a medium frequency vibration, the liquid flows reciprocatingly between the first sub-liquid chamber and the second sub-liquid chamber via the second orifice whose length is shorter than that of the first orifice or whose cross-sectional area is larger than that of the first orifice. This makes it possible to improve a vibration isolating effect with respect to the medium frequency vibration.

In the present invention, it is preferable that the first orifice allows reduction of vibrations in a shake vibration range and the second orifice allows reduction of vibrations in an idle vibration range. The vibration isolating apparatus as described above can prevent transmission of vibrations generated by the engine.

DESCRIPTION OF THE PREFERRED EMBODIMENTS

Figure 1:
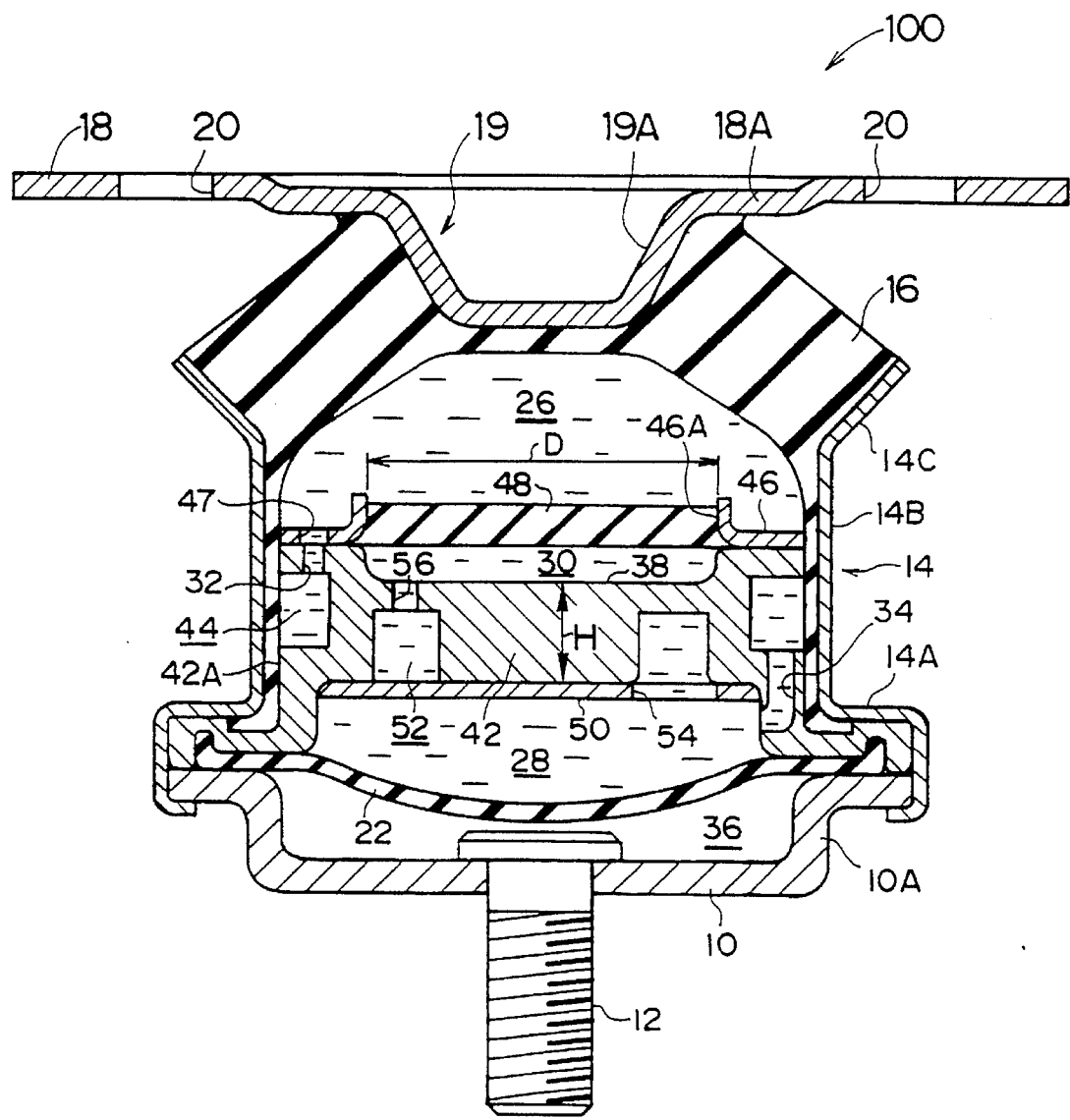
FIG. 1 is a cross-sectional view showing a vibration isolating apparatus of a first embodiment according to the present invention.
Figure 2:
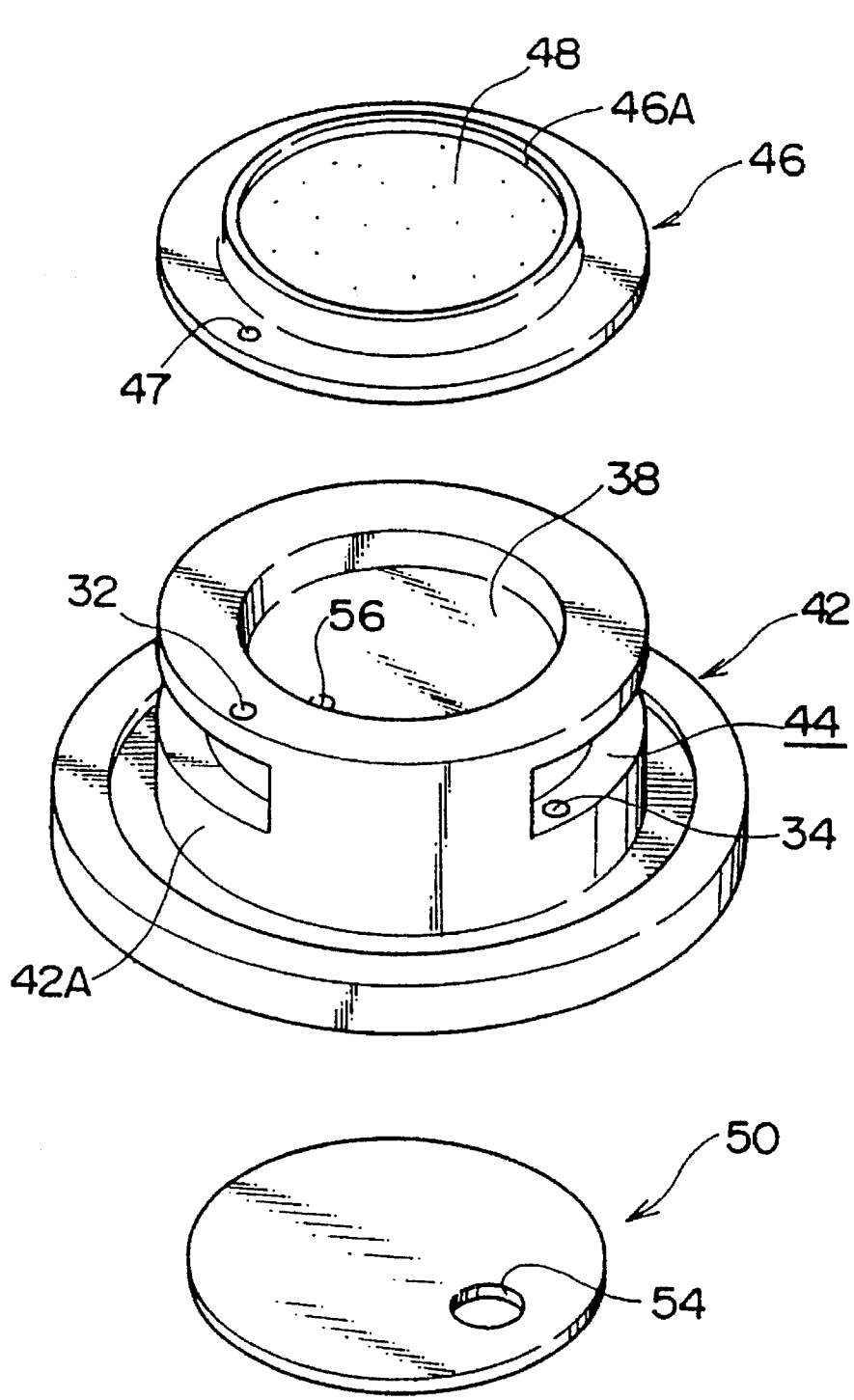
FIG. 2 is an exploded perspective view of a partition wall member, membrane, ring plate, sealing plate and the like which are used in the vibration isolating apparatus of the first embodiment.

Referring now to FIGS. 1 and 2, a description will be given of a vibration isolating apparatus according to a first embodiment of the present invention.

As shown in FIG. 1, a bolt 12 projects from a lower side of a bottom plate 10 which is a first mounting member forming a lower portion of a vibration isolating apparatus 100. The bolt 12 is used to connect and fix the vibration isolating apparatus 100 to a vehicle body (not shown), which is a vibration-receiving portion, by screwing an unillustrated nut into the bolt 12. A vertical wall 10A is formed uprightly around the bottom plate 10. A cylindrical supporting cylinder 14 is mounted to a flange-shaped upper end portion of the vertical wall 10A. Namely, the supporting cylinder 14 includes a disk-shaped flange portion 14A, and an outer peripheral end portion of the flange portion 14A is caulked such that the vertical wall 10A and the flange portion 14A are fixed to each other. A cylindrical trunk portion 14B is formed uprightly from and perpendicular to an inner peripheral portion of the flange portion 14A and a supporting cylinder portion 14C is continuously formed from an upper end portion of the trunk portion 14B in such a manner as to widen therefrom in an upper direction.

An outer periphery of a cylinder-shaped rubber elastic body 16 is adhered by vulcanization to an inner periphery of the supporting cylinder portion. 14C. An inner periphery of the elastic body 16 is adhered by vulcanization to a top plate 18, which is a second mounting member, formed in such a manner that a central portion thereof projects downward.

The top plate 18 is formed by press working of one sheet of plate material. A convex portion 19 having an annular inclined surface 19A is formed by press working and the elastic body 16 is adhered by vulcanization to the inclined surface 19A. Accordingly, the elastic body 16 is mounted in such a state as to be interposed between the top plate 18 and the bottom plate 10.

Figure 6:
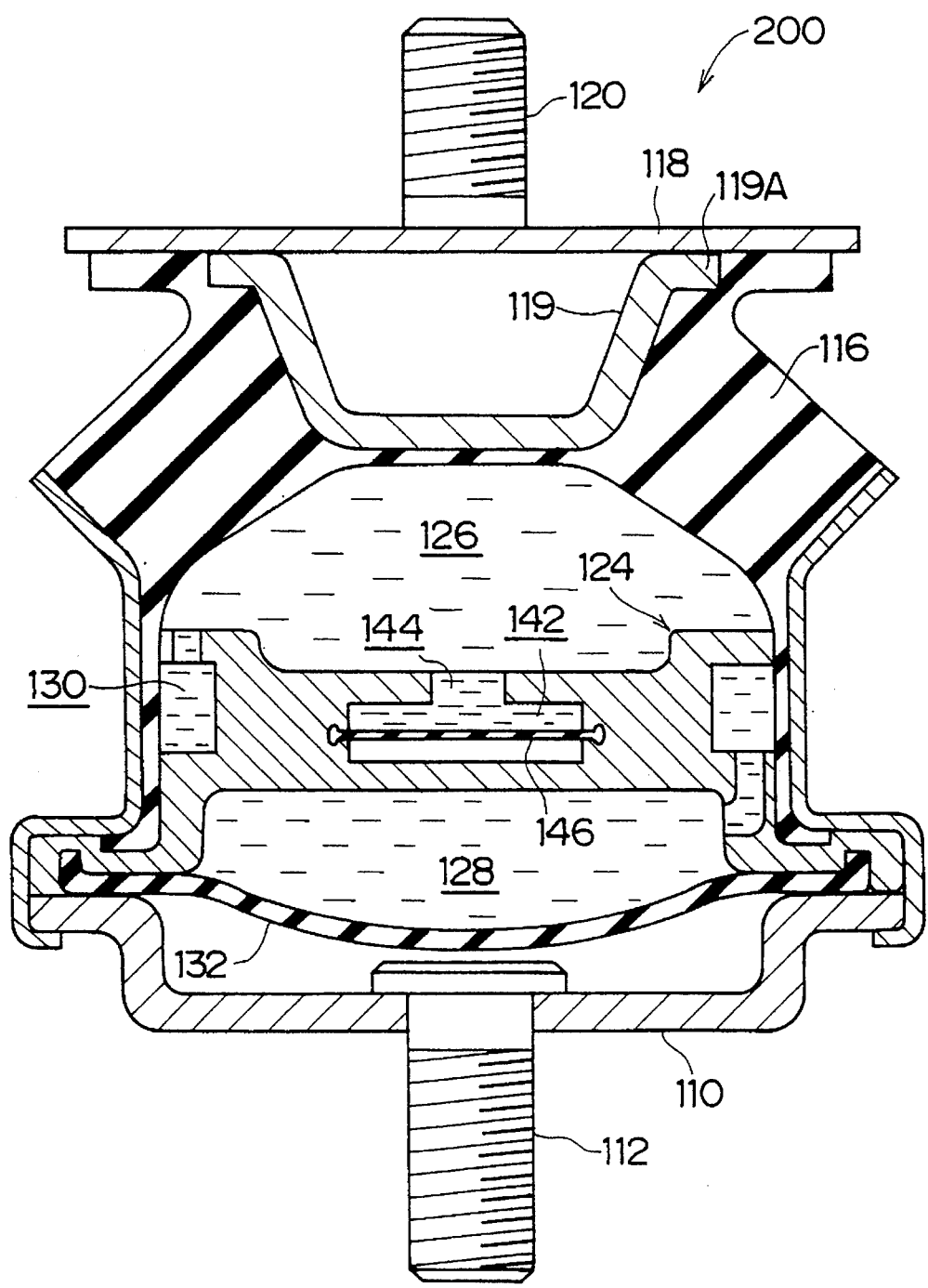
FIG. 6 is a cross-sectional view showing a conventional vibration isolating apparatus.

A stepped portion 18A is formed at the side of an outer periphery of the convex portion 19. Further, a plurality of mounting holes 20 are formed at an outer peripheral portion of the top plate 18 which is higher than the stepped portion 18A by one step. Thus, a bolt (not shown) is screwed into each of the plurality of mounting holes 20 in the same way as the top plate 118 of the conventional apparatus (see FIG. 6). The bolt is used to connect the vibration isolating apparatus 100 with an engine which is a vibration-generating portion and causes the engine to be fixed to the top plate 18.

On the other hand, an outer peripheral portion of a rubber diaphragm 22 together with the vertical wall 10A are caulked to the flange portion 14A and the diaphragm 22 is fixed between the bottom plate 10 and the supporting cylinder 14. Provided between the diaphragm 22, supporting cylinder 14 and elastic body 16 is a liquid chamber which is defined by inner wall surfaces of these members. The liquid chamber is filled with liquid such as water, oil, or the like. A partition wall member 42 made of synthetic resins as shown in FIGS. 1 and 2 is disposed within the trunk portion 14B of the supporting cylinder 14 in such a manner as to be fit into the trunk portion 14B via a thin-walled portion of the elastic body 16. For this reason, the partition wall member 42 divides the liquid chamber into a main liquid chamber 26 and a first sub-liquid chamber 28.

A circular concave portion 38 forming a space which serves as a second sub-liquid chamber 30 is provided at the center of an upper portion of the partition wall member 42. A groove portion serving as a first orifice 44 is formed at an outer peripheral end portion 42A (i.e., an outer periphery of the partition wall member 42) over a half round of the outer peripheral end portion 42A.

A small hole 32 is formed at one end portion of the first orifice 44 for communication between the main liquid chamber 26 and the first orifice 44, and a small hole 34 is formed at the other end portion thereof for communication between the first sub-liquid chamber 28 and the first orifice 44. Accordingly, the first orifice 44, small holes 32, 34 cause the main liquid chamber 26 and the first sub-liquid chamber 28 to communicate with each other.

Meanwhile, a lower portion of the outer peripheral end portion 42A projects outwardly. The lower portion of the outer peripheral end portion 42A abuts against a bottom surface of the flange portion 14A, and at the same time, is caulked to the flange portion 14A together with the vertical wall 10A and the diaphragm 22. Further, an air chamber 36 is provided between the diaphragm 22 and the bottom wall 10, so that the diaphragm 22 can be deformed. For this reason, at least a portion of an inner wall of the first sub-liquid chamber 28 is formed so as to be elastically deformable by the diaphragm 22.

On the other hand, a ring plate 46 is disposed at an upper portion of the partition wall member 42 in such a manner as to be fixed thereto by means of bonding or the like. The ring plate 46 is constructed in such a manner that an opening portion 46A is formed at the center of the ring plate 46 to face the second sub-liquid chamber 30. An outer periphery of a disk-shaped rubber membrane 48 is adhered by vulcanization to an inner periphery of the opening portion 45A of the ring plate 46 such that the membrane 48 is disposed in the opening portion 46A. Accordingly, the membrane 48 forms an elastic membranous body for isolating the main liquid chamber 26 and the second sub-liquid chamber 30 from each other. It should be noted that a hole portion 47 is formed in the ring plate 45 so as to be opposed to the small hole 32.

Further, a disk-shaped sealing plate 50 is disposed on and fixed to a lower surface of the partition wall member 42 by means of bonding or the like. A groove portion which is a second orifice 52 is formed on the lower surface of the partition wall member 42 into the shape of a ring. A lower side of the groove portion is sealed by the sealing plate 50. The second orifice 52 is constructed in that the length thereof in the longitudinal direction is shorter than that of the first orifice 44 and the cross-sectional area thereof is greater than that of the first orifice 44 such that transit resistance of the liquid in the second orifice 52 is smaller than that in the first orifice 44. Further, the longitudinal-directional length of the second orifice 52 is longer than the thickness H of the partition wall member 42.

Meanwhile, a hole portion 54 is formed in the sealing plate 50 so as to be opposed to one end portion of the second orifice 52 and a hole portion 56 is formed at the other end portion of the second orifice 52 for communication between the second sub-liquid chamber 30 and the second orifice 52. Accordingly, the second orifice 52 and hole portions 54, 56 cause the first sub-liquid chamber 28 and the second sub-liquid chamber 30 to communicate with each other.

Next, an operation of the first embodiment will be described.

When the engine mounted on the top plate 18 operates, vibration of the engine is transmitted to the elastic body 16 via the top plate 18 and the connecting plate 19. The elastic body 16 functions as a vibration-absorbing main body. When the elastic body 16 absorbs vibration by its damping function based on internal friction of the elastic body 16, vibration is difficult to be transmitted to a vehicle body connected to the bottom plate 10.

Further, when vibration generated by the engine is a low frequency vibration including shake vibration or the like (for example, vibration of a frequency of less than 15 Hz), the main liquid chamber 26 expands and contracts in correspondence with deformation of the elastic body 16. At the same time, a liquid flows reciprocatingly between the main liquid chamber 26 and the first sub-liquid chamber 28 connected with the main liquid chamber 26 via the first orifice 44. Thus, a vibration isolating effect can be improved by a damping function based on viscous resistance of the liquid in the first orifice 44 and the liquid resonance.

Further, when vibration generated by the engine is a medium frequency vibration including idle vibration or the like (for example, vibration of a frequency of 20 to 40 Hz), the first orifice 44 becomes clogged. However, when the membrane 48 forming a portion of the inner wall of the main liquid chamber 26 deforms, the medium frequency vibration is transmitted to the second sub-liquid chamber 30 opposed to the main liquid chamber 26 via the membrane 48.

For this reason, the liquid flows reciprocatingly between the first sub-liquid chamber 28 and the second sub-liquid chamber 30 via the second orifice 52 formed such that, in order to make the transit resistance of the liquid in the second orifice 52 smaller than that in the first orifice 44, the longitudinal-directional length of the second orifice 52 is shorter than that of the first orifice 44 and the cross-sectional area thereof is greater than that of the first orifice 44, thereby causing a dynamic spring constant to decrease. As a result, a vibration isolating effect with respect to the medium frequency vibrations can be improved.

On the other hand, when vibration generated by the engine is a high frequency vibration in which shaking sounds (for example, vibration of a frequency of greater than 40 Hz) are generated, the first orifice 44 and the second orifice 52 respectively become clogged. However, the membrane 48 interposed between the main liquid chamber 26 and the second sub-liquid chamber 30 deforms in a corrugated state or the like, so that the dynamic spring constant decreases. As a result, the high frequency vibration is absorbed and a vibration isolating effect can be improved. Further, since the membrane 48 is also used as a partition wall of the second sub-liquid chamber 30, the structure of the vibration isolating apparatus 100 becomes simple.

Meanwhile, when the size of the diameter D of the membrane 48 is altered, a frequency of vibration absorbed by the membrane 48 changes. Accordingly, when the vibration isolating apparatus 100 is employed for a case of vibration of a different frequency in which shaking sounds or the like are generated, it becomes possible to easily alter the design of the vibration isolating apparatus 100 in correspondence with such a case.

Further, according to the present embodiment, a single top plate 18 is used in place of the top plate 118 and the connecting plate 119 of the conventional apparatus. This results in decrease in the number of parts of the vibration isolating apparatus 100. Further, since a welding operation required when the top plate 118 and the connecting plate 119 are used is not needed, the cost for welding of the top plate 118 and the connecting plate 119 is also not needed. At the same time, there is no possibility that a cleaning liquid remains in a space between the top plate 118 and the connecting plate 119 when the top plate 118 and the connecting plate 119 are cleaned for vulcanization and bonding of the elastic body 116.

In addition, there is no possibility that an end portion of the flange portion 119A of the connecting plate 119 contacts the elastic body 116 and cracks are formed in the elastic body 116 by an edge of the end portion of the flange portion 119A as occurring in the conventional apparatus. As a result, durability of the elastic body 116 improves.

As described above, the structure of the vibration isolating apparatus 100 on the side of the second mounting member is simplified, which allows reduction in cost of the vibration isolating apparatus 100.

Further, depending on the shape of the convex portion 19 which is easily formed into any free shape by press working, the ratio of rigidity of the elastic body 16 between a vertical-directional spring and a horizontal-directional spring can freely be changed. For this reason, by changing the shape of the convex portion 19, vibration in an arbitrary frequency range can easily be reduced.

Next, a description of a vibration isolating apparatus according to a second embodiment of the present invention will be given with reference to FIG. 3. It should be noted that the same members as those of the first embodiment will be denoted by the same reference numerals, and a description thereof will be omitted.

Figure 3:
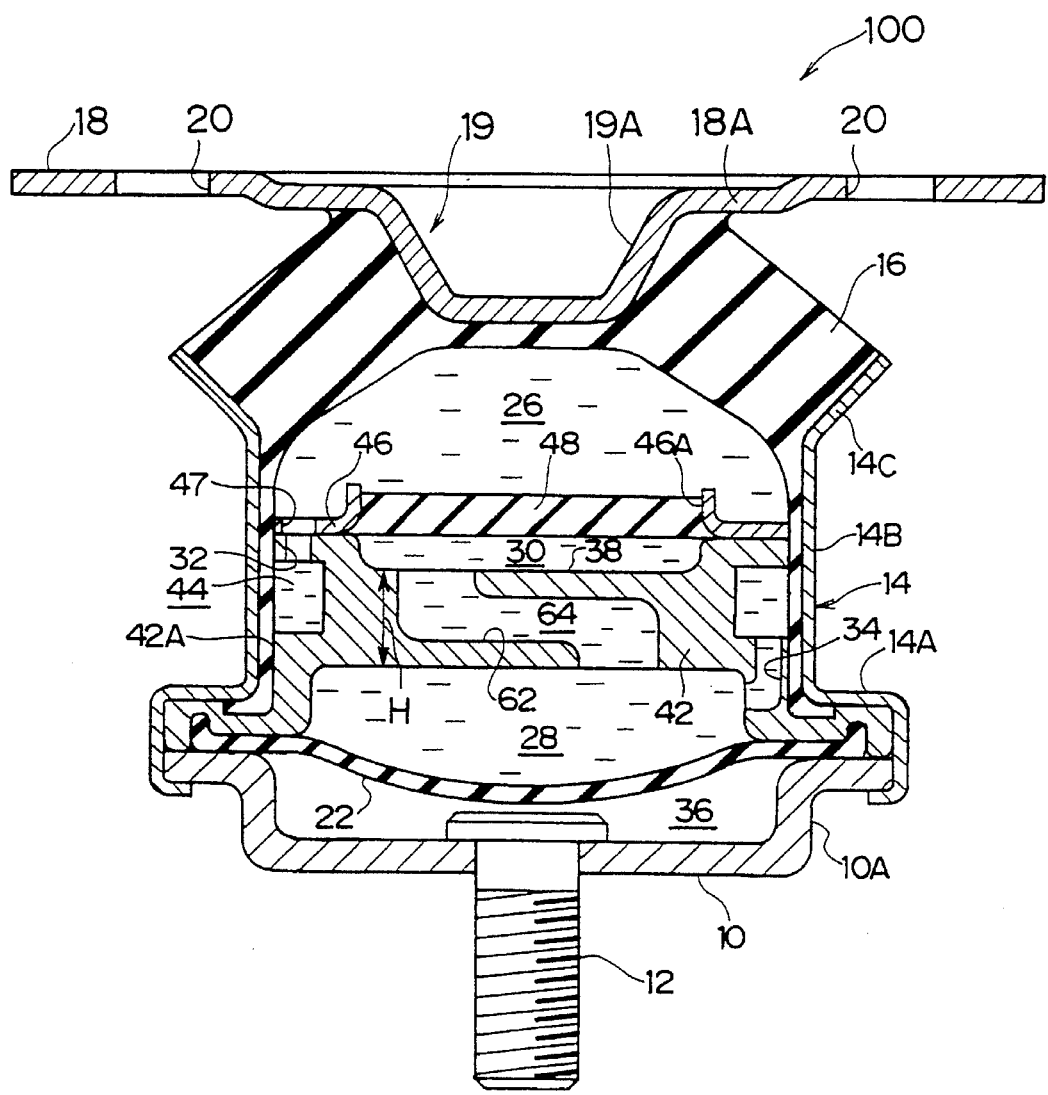
FIG. 3 is a cross-sectional view showing a vibration isolating apparatus of a second embodiment according to the present invention.

As shown in FIG. 3, the vibration isolating apparatus 100 is constructed in the substantially same way as the first embodiment, in which the groove portion serving as the second orifice 52 is not formed on the lower surface of the partition wall member 42 and the sealing plate 50 also is not formed. However, instead of the groove portion and the sealing plate 50 of the first embodiment, a hole portion 62 is formed within the partition wall member 42 in such a manner as to extend in a straight line in upward and horizontal directions of the paper of FIG. 3. A left end of the hole portion 62 is connected with the second sub-liquid chamber 30 and a right end thereof is connected with the first sub-liquid chamber 28. Further, the length of the hole portion 62 in the longitudinal direction thereof is longer than the thickness H of the partition wall member 42.

Accordingly, in this embodiment, the hole portion 62 forms a second orifice 64 provided for communication between the first sub-liquid chamber 28 and the second sub-liquid chamber 30. Further, the second orifice 64 has the same cross-sectional area as that of the second orifice 52 of the first embodiment and the longitudinal-directional length of the second orifice 64 can be made shorter than the second orifice 52 because the second orifice 64 extends in a straight line. For this reason, the transit resistance of the liquid in the second orifice 64 can be smaller than that in the second orifice 52 of the first embodiment. According to the second embodiment, for example, vibration of a relatively high frequency in the idle vibrations can be absorbed actively.

Next, a description of a vibration isolating apparatus according to a third embodiment of the present invention will be given with reference to FIGS. 4 and 5. It should be noted that the same members as those of the first and second embodiments will be denoted by the same reference numerals, and a description thereof will be omitted.

Figure 4:
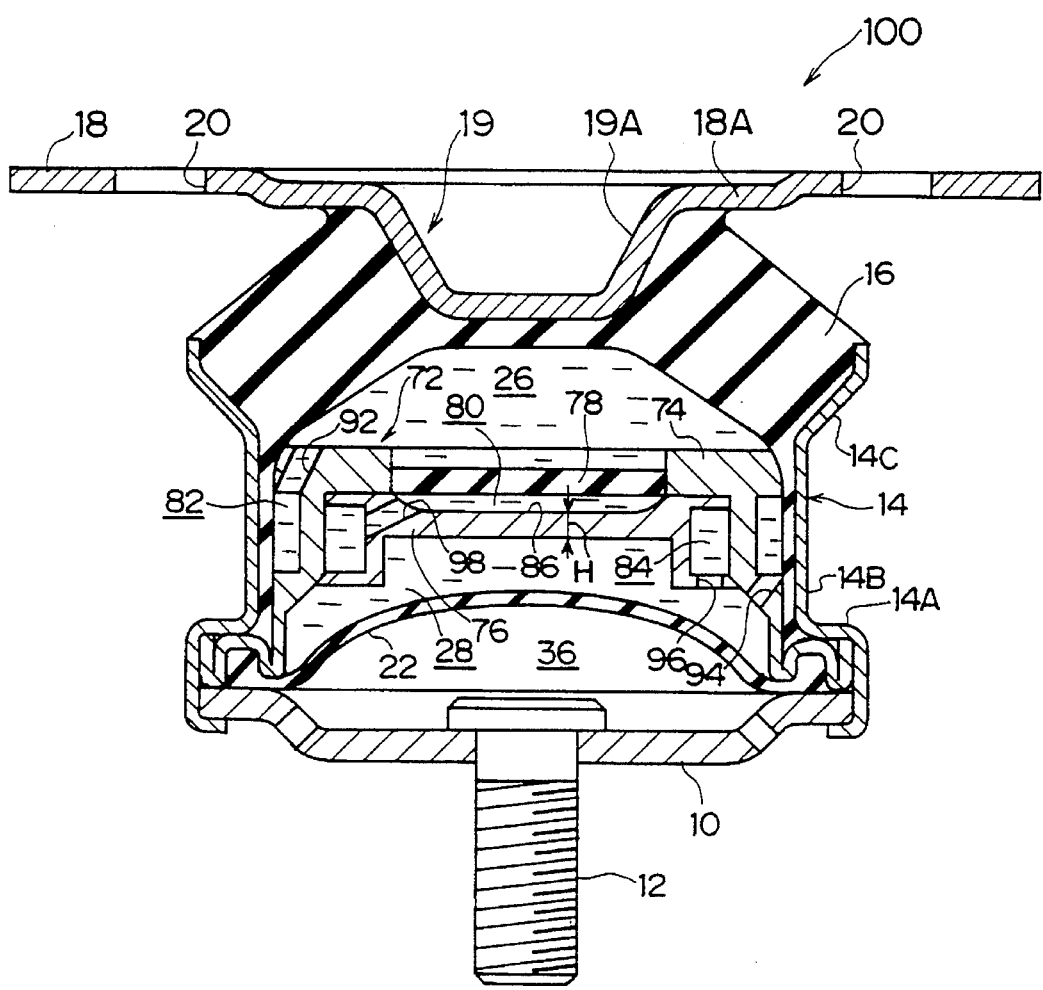
FIG. 4 is a cross-sectional view showing a vibration isolating apparatus of a third embodiment according to the present invention.
Figure 5:
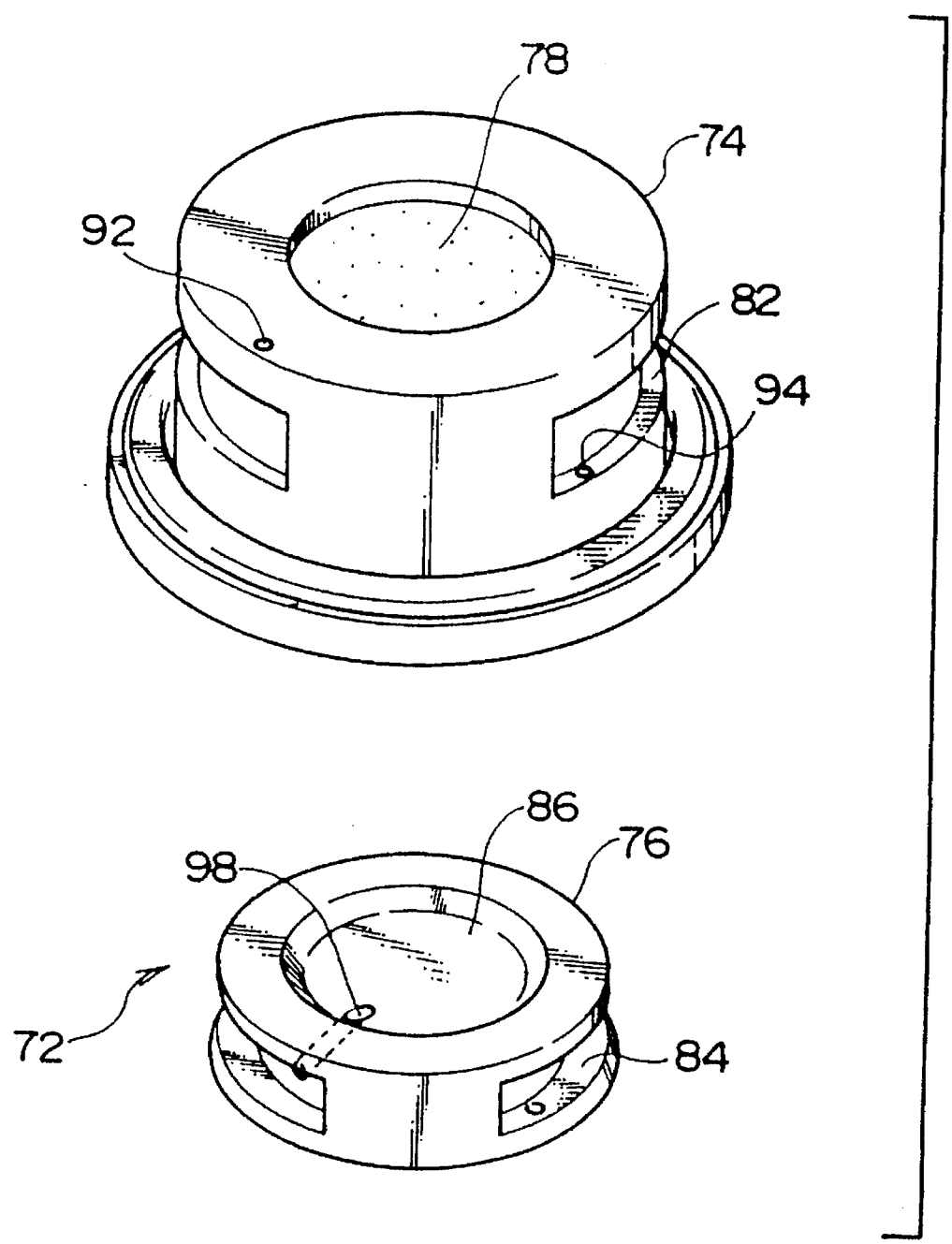
FIG. 5 is an exploded perspective view of a partition wall member used in the vibration isolating apparatus of the third embodiment.

As shown in FIGS. 4 and 5, the vibration isolating apparatus 100 has the substantially same structure as the first embodiment, but a partition wall member 72 is formed by an outer peripheral partition wall member 74 and an inner peripheral partition wall member 76 fit to an inner periphery of the outer peripheral partition wall member 74.

Namely, a groove portion which is a first orifice 82 is formed in the outer peripheral partition wall member 74 which has a flange portion at a lower side thereof and is formed into the shape of a ring. The groove portion is formed over a half round of an outer periphery of the outer peripheral partition wall member 74. The outer periphery of the outer peripheral partition wall member 74 in which the groove portion is formed is fit into the trunk portion 14B of the supporting cylinder 14. Further, a groove portion which is a second orifice 84 is as well formed in an outer periphery of the inner peripheral partition wall member 76 over a half round of the outer periphery thereof. The outer periphery of the inner peripheral partition wall member 76 is fit into the inner periphery of the outer peripheral partition wall member 74, so that the outer peripheral partition wall member 74 and the inner peripheral partition wall member 76 are fixed to each other. It should be noted that, in order to made the transit resistance of the liquid in the second orifice 84 smaller than that in the first orifice 82, the length of the second orifice 84 in the longitudinal direction thereof is made shorter than that of the first orifice 82 and the cross-sectional area of the second orifice 84 is made greater than that of the first orifice 82. Further, the longitudinal-directional length of the second orifice 84 is made longer than the thickness H of the inner peripheral partition wall member 76.

Moreover, a rubber membrane 78 which is an elastic membranous body is disposed on the upper side of the outer peripheral partition wall member 74 in such a manner as to be adhered by vulcanization to the outer peripheral partition wall member 74. Further, a circular concave portion 86 forming a space which serves as a second sub-liquid chamber 80 is formed in the inner peripheral partition wall member 76 so as to face the membrane 78.

On the other hand, a small hole 92 is formed at one end portion of the first orifice 82 for communication between the main liquid chamber 26 and the first orifice 82, and a small hole 94 is formed at the other end portion of the first orifice 28 for communication between the first sub-liquid chamber 28 and the first orifice 82. Accordingly, the first orifice 82 and small holes 92, 94 cause the main liquid chamber 26 and the first sub-liquid chamber 28 to communicate with each other. Further, a hole portion 96 is formed at one end portion of the second orifice 84 for communication between the first sub-liquid chamber 28 and the second orifice 84, and a hole portion 98 is formed at the other end portion of the second orifice 84 for communication between the second sub-liquid chamber 80 and the second orifice 84. Accordingly, the second orifice 84 and hole portions 96, 98 cause the first sub-liquid chamber 28 and the second sub-liquid chamber 80 to communicate with each other.

As described above, since the third embodiment is constructed in the same way as the first and second embodiments, it has the same operations as those of the first and second embodiments. Therefore, a redundant description of operations will be omitted.

Meanwhile, in each of the above-described embodiments, the structure in which the bottom plate 10 which is the first mounting member is connected to the vehicle body and the top plate 18 which is the second mounting member is connected to the engine. However, a reversely-connected structure may also be used.

On the other hand, each of the above-described embodiments is used for the purpose of isolating vibration generated by the engine mounted on the vehicle. However, it is a matter of course that the vibration isolating apparatus of the present invention can be used in a body mount of a vehicle, and the like, or can be used for purposes other than in the vehicle. Further, each shape and size of the elastic body, elastic membranous body or the like, and the number of orifices are not limited to those of the above-described embodiments.

Since the vibration isolating apparatus of the present invention is constructed as described above, it becomes possible to reliably reduce vibrations in a range from low frequencies to high frequencies and to improve vibration isolating characteristics of the vibration isolating apparatus.

What is claimed is:

1. A vibration isolating apparatus comprising:
   a first mounting member connected to one of a vibration-generating portion and a vibration-receiving portion;
   a second mounting member connected to another of the vibration-generating portion and the vibration-receiving portion;
   an elastic body mounted in such a manner as to be interposed between said first mounting member and said second mounting member;
   a main liquid chamber of which at least a portion of an inner wall is formed of said elastic body and which is filled with a liquid;
   a first sub-liquid chamber separated from said main liquid chamber by a partition wall member interposed between said main liquid chamber and said first sub-liquid chamber, at least a portion of an inner wall of said first sub-liquid chamber being provided to be deformable;
   a first orifice formed in said partition wall member and provided for communication between said main liquid chamber and said first sub-liquid chamber;
   a second sub-liquid chamber formed in said partition wall member so as to face said main liquid chamber;
   an elastic membranous body formed into the shape of a membrane and provided to separate said main liquid chamber and said second sub-liquid chamber from each other; and
   a second orifice provided for communication between said first sub-liquid chamber and said second sub-liquid chamber and provided such that a transit resistance of a liquid in said second orifice is smaller than that in said first orifice.

2. A vibration isolating apparatus according to claim 1, wherein the length of said second orifice in a longitudinal direction thereof is longer than the thickness of said partition wall member.

3. A vibration isolating apparatus according to claim 1, wherein said first orifice causes vibration in a shake vibration range to be reduced and said second orifice causes vibration in an idle vibration range, which is a frequency higher than the shake vibration range, to be reduced.

4. A vibration isolating apparatus according to claim 1, wherein said second orifice is formed into the shape of a ring.

5. A vibration isolating apparatus according to claim 1, wherein said second orifice is formed in a straight line such that a longitudinal-directional length thereof is longer than the thickness of said partition wall member.

6. A vibration isolating apparatus according to claim 1, wherein said second orifice is formed by a groove portion formed in said partition wall member, and a sealing plate fixed to said partition wall member to seal an open side of the groove portion.

7. A vibration isolating apparatus according to claim 1, wherein said second orifice is formed by a groove portion provided in an outer periphery of an inside partition wall member of a pair of said partition wall members which are fit to each other.

8. A vibration isolating apparatus according to claim 1, wherein said elastic membranous body is mounted to a ring-shaped member and the ring-shaped member is superposed on said partition wall member.

9. A vibration isolating apparatus according to claim 1, wherein said second sub-liquid chamber is formed by a space within a concave portion formed in said partition wall member.

10. A vibration isolating apparatus according to claim 1, wherein at least one of said first and second mounting members is adhered to said elastic body and the mounting member adhered to said elastic body is formed of one sheet of plate material having a convex portion at a central portion thereof, in which an annular inclined surface is formed, and having a hole portion for insertion of a bolt on the side of an outer periphery of the mounting member.

11. A vibration isolating apparatus comprising:

a first mounting member connected to one of a vibration-generating portion and a vibration-receiving portion;

a second mounting member connected to another of the vibration-generating portion and the vibration-receiving portion;

an elastic body mounted in such a manner as to be interposed between said first mounting member and said second mounting member;

a main liquid chamber of which at least a portion of an inner wall is formed of said elastic body and which is filled with a liquid;

a first sub-liquid chamber separated from said main liquid chamber by a partition wall member interposed between said main liquid chamber and said first sub-liquid chamber, at least a portion of an inner wall of said first sub-liquid chamber being provided to be deformable;

a first orifice formed in said partition wall member and provided for communication between said main liquid chamber and said first sub-liquid chamber;

a second sub-liquid chamber formed in said partition wall member so as to face said main liquid chamber;

an elastic membranous body formed into the shape of a membrane and provided to separate said main liquid chamber and said second sub-liquid chamber from each other; and a second orifice provided for communication between said first sub-liquid chamber and said second sub-liquid chamber and provided such that a length of said second orifice in a longitudinal direction thereof is shorter than that of said first orifice.

12. A vibration isolating apparatus according to claim 11, wherein the length of said second orifice in a longitudinal direction thereof is longer than the thickness of said partition wall member.

13. A vibration isolating apparatus according to claim 11, wherein said first orifice causes vibration in a shake vibration range to be reduced and said second orifice causes vibration in an idle vibration range, which is a frequency higher than the shake vibration range, to be reduced.

14. A vibration isolating apparatus according to claim 11, wherein said second orifice is formed into the shape of a ring.

15. A vibration isolating apparatus according to claim 11, wherein said second orifice is formed in a straight line such that a longitudinal-directional length thereof is longer than the thickness of said partition wall member.

16. A vibration isolating apparatus according to claim 11, wherein said second orifice is formed by a groove portion formed in said partition wall member, and a sealing plate fixed to said partition wall member to seal an open side of the groove portion.

17. A vibration isolating apparatus according to claim 11, wherein said second orifice is formed by a groove portion provided in an outer periphery of an inside partition wall member of a pair of said partition wall members which are fit to each other.

18. A vibration isolating apparatus according to claim 11, wherein said elastic membranous body is mounted to a ring-shaped member and the ring-shaped member is superposed on said partition wall member.

19. A vibration isolating apparatus according to claim 11, wherein said second sub-liquid chamber is formed by a space within a concave portion formed in said partition wall member.

20. A vibration isolating apparatus according to claim 11, wherein at least one of said first and second mounting members is adhered to said elastic body and the mounting member adhered to said elastic body is formed of one sheet of plate material having a convex portion at a central portion thereof, in which an annular inclined surface is formed, and having a hole portion for insertion of a bolt on the side of an outer periphery of the mounting member.

21. A vibration isolating apparatus comprising:

a first mounting member connected to one of a vibration-generating portion and a vibration-receiving portion;

a second mounting member connected to another of the vibration-generating portion and the vibration-receiving portion;

an elastic body mounted in such a manner as to be interposed between said first mounting member and said second mounting member;

a main liquid chamber of which at least a portion of an inner wall is formed of said elastic body and which is filled with a liquid;

a first sub-liquid chamber separated from said main liquid chamber by a partition wall member interposed between said main liquid chamber and said first sub-liquid chamber, at least a portion of an inner wall of said first sub-liquid chamber being provided to be deformable;

a first orifice formed in said partition wall member and provided for communication between said main liquid chamber and said first sub-liquid chamber;

a second sub-liquid chamber formed in said partition wall member so as to face said main liquid chamber;

an elastic membranous body formed into the shape of a membrane and provided to separate said main liquid chamber and said second sub-liquid chamber from each other; and a second orifice provided for communication between said first sub-liquid chamber and said second sub-liquid chamber and provided such that a cross-sectional area of said second orifice is greater than that of said first orifice.

22. A vibration isolating apparatus according to claim 21, wherein said first orifice causes vibration in a shake vibration range to be reduced and said second orifice causes vibration in an idle vibration range, which is a frequency higher than the shake vibration range, to be reduced.

23. A vibration isolating apparatus according to claim 21, wherein said second orifice is formed into the shape of a ring.

24. A vibration isolating apparatus according to claim 21, wherein said second orifice is formed in a straight line such that a longitudinal-directional length thereof is longer than the thickness of said partition wall member.

* * * * *